(12) United States Patent
Xu et al.

(10) Patent No.: US 10,904,809 B2
(45) Date of Patent: Jan. 26, 2021

(54) METHODS AND DEVICES FOR SUPPORTING RELEASE OF SIPTO BEARER OR LIPA BEARER IN DUAL-CONNECTIVITY ARCHITECTURE

(71) Applicant: Samsung Electronics Co., Ltd., Gyeonggi-do (KR)

(72) Inventors: Lixiang Xu, Beijing (CN); Hong Wang, Beijing (CN); Xiaowan Ke, Beijing (CN)

(73) Assignee: Samsung Electronics Co., Ltd

( * ) Notice: Subject to any disclaimer, the term of this patent is extended or adjusted under 35 U.S.C. 154(b) by 181 days.

(21) Appl. No.: 15/764,513

(22) PCT Filed: Sep. 30, 2016

(86) PCT No.: PCT/KR2016/010986
§ 371 (c)(1),
(2) Date: Mar. 29, 2018

(87) PCT Pub. No.: WO2017/057955
PCT Pub. Date: Apr. 6, 2017

(65) Prior Publication Data
US 2019/0059030 A1 Feb. 21, 2019

(30) Foreign Application Priority Data
Sep. 30, 2015 (CN) .......................... 2015 1 0640863

(51) Int. Cl.
*H04W 36/08* (2009.01)
*H04W 36/00* (2009.01)
(Continued)

(52) U.S. Cl.
CPC ............. *H04W 36/08* (2013.01); *H04L 5/001* (2013.01); *H04L 5/0098* (2013.01);
(Continued)

(58) Field of Classification Search
CPC . H04W 36/08; H04W 36/0069; H04W 36/22; H04W 76/30; H04W 76/32;
(Continued)

(56) References Cited

U.S. PATENT DOCUMENTS 10,285,104 B2 * 5/2019 Gao .................... H04W 36/125
10,560,837 B2 * 2/2020 Xu ......................... H04W 8/082
(Continued)

FOREIGN PATENT DOCUMENTS

EP          2 790 457        10/2014
WO     WO 2015/104345        7/2015
(Continued)

OTHER PUBLICATIONS

European Search Report dated Aug. 9, 2018 issued in counterpart application No. 16852101.1-1219, 9 pages.
(Continued)

*Primary Examiner* — Wutchung Chu
(74) *Attorney, Agent, or Firm* — The Farrell Law Firm, P.C.

(57) ABSTRACT

The present disclosure discloses a method for supporting release of a SIPTO bearer or a LIPA bearer in dual-connectivity architecture. The method is implemented as follows. A MeNB sends a message to a SeNB. The message contains indication information for SIPTO at local network bearer deactivation or LIPA bearer deactivation. The indication information may indicate the SeNB to notify a collocated LGW of releasing PDN connection of SIPTO at local network or the PDN connection of LIPA. After receiving the message, the SeNB removes radio and control plane related resources associated to the UE context or the SIPTO at local network bearer or the LIPA bearer, and if the message contains the indication information for SIPTO@LN bearer deactivation or LIPA bearer deactivation, sends an internal
(Continued)

signaling to the collocated LGW to indicate the collocated LGW to release the PDN connection of the SIPTO at local network or the PDN connection of the LIPA. The SeNB is a SeNB supporting functions of the LGW that supports operations of the SIPTO at local network or the operations of the LIPA. By the method of the present disclosure, the SIPTO bearer or the LIPA bearer in the dual-connectivity architecture can be released, thereby avoiding inaccurate operations in an access network, ensuring that the SIPTO bearer or the LIPA bearer can be released duly and accurately, and avoiding inaccurate release of the SIPTO bearer or the LIPA bearer.

16 Claims, 7 Drawing Sheets

(51) Int. Cl.
| | | |
|---|---|---|
| *H04L 5/00* | (2006.01) | |
| *H04W 76/32* | (2018.01) | |
| *H04W 76/30* | (2018.01) | |
| *H04W 36/22* | (2009.01) | |
| *H04W 8/08* | (2009.01) | |
| *H04W 76/34* | (2018.01) | |
| *H04W 88/08* | (2009.01) | |
| *H04W 88/16* | (2009.01) | |

(52) U.S. Cl.
CPC ....... *H04W 36/0069* (2018.08); *H04W 36/22* (2013.01); *H04W 76/30* (2018.02); *H04W 76/32* (2018.02); *H04W 8/082* (2013.01); *H04W 76/34* (2018.02); *H04W 88/08* (2013.01); *H04W 88/16* (2013.01)

(58) Field of Classification Search
CPC ..... H04W 76/34; H04W 8/082; H04W 88/08; H04W 88/16; H04L 5/001; H04L 5/0098
See application file for complete search history.

(56) References Cited

U.S. PATENT DOCUMENTS

| | | | |
|---|---|---|---|
| 2012/0189016 A1 | 7/2012 | Bakker et al. | |
| 2013/0016696 A1* | 1/2013 | Adjakple | H04W 72/0486 370/331 |
| 2014/0010204 A1* | 1/2014 | Xu | H04W 36/38 370/331 |
| 2014/0301364 A1 | 10/2014 | Xu et al. | |
| 2015/0029999 A1* | 1/2015 | Horn | H04W 76/12 370/331 |
| 2015/0043492 A1* | 2/2015 | Baek | H04W 76/15 370/329 |
| 2015/0351139 A1* | 12/2015 | Zhang | H04L 43/08 370/329 |
| 2016/0057585 A1* | 2/2016 | Horn | H04W 40/02 370/312 |
| 2016/0174285 A1* | 6/2016 | Ke | H04W 76/25 370/329 |
| 2016/0212798 A1* | 7/2016 | Jha | H04W 16/14 |
| 2016/0302126 A1* | 10/2016 | Gao | H04W 36/125 |
| 2016/0309319 A1* | 10/2016 | Gao | H04W 8/26 |
| 2016/0323805 A1 | 11/2016 | Ryu et al. | |
| 2016/0345204 A1 | 11/2016 | Godin et al. | |
| 2016/0373987 A1* | 12/2016 | Ahmad | H04W 36/22 |
| 2017/0013668 A1* | 1/2017 | Chang | H04W 76/19 |
| 2017/0215062 A1* | 7/2017 | Xu | H04L 61/2007 |
| 2017/0231026 A1* | 8/2017 | Vesterinen | H04W 36/0069 |
| 2017/0374578 A1* | 12/2017 | Selvaganapathy | H04W 28/08 |
| 2018/0007536 A1* | 1/2018 | Xu | H04W 76/15 |
| 2018/0213450 A1* | 7/2018 | Futaki | H04W 72/04 |
| 2018/0242395 A1* | 8/2018 | Selvaganapathy | H04W 88/182 |
| 2018/0295670 A1* | 10/2018 | Decarreau | H04W 76/38 |

FOREIGN PATENT DOCUMENTS

| | | |
|---|---|---|
| WO | WO 2015/108337 | 7/2015 |
| WO | WO 2015/138908 | 9/2015 |

OTHER PUBLICATIONS

PCT/ISA/210 Search Report issued on PCT/KR2016/010986 (pp. 3).

PCT/ISA/237 Written Opinion issued on PCT/KR2016/010986 (pp. 7).

* cited by examiner

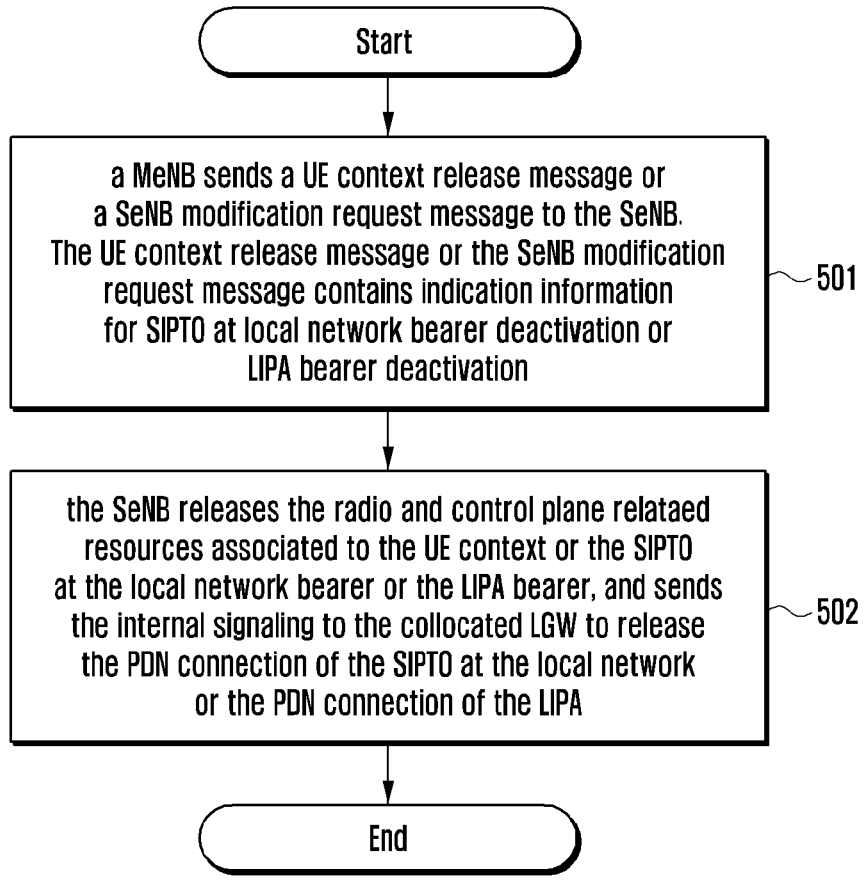
[Fig. 5]

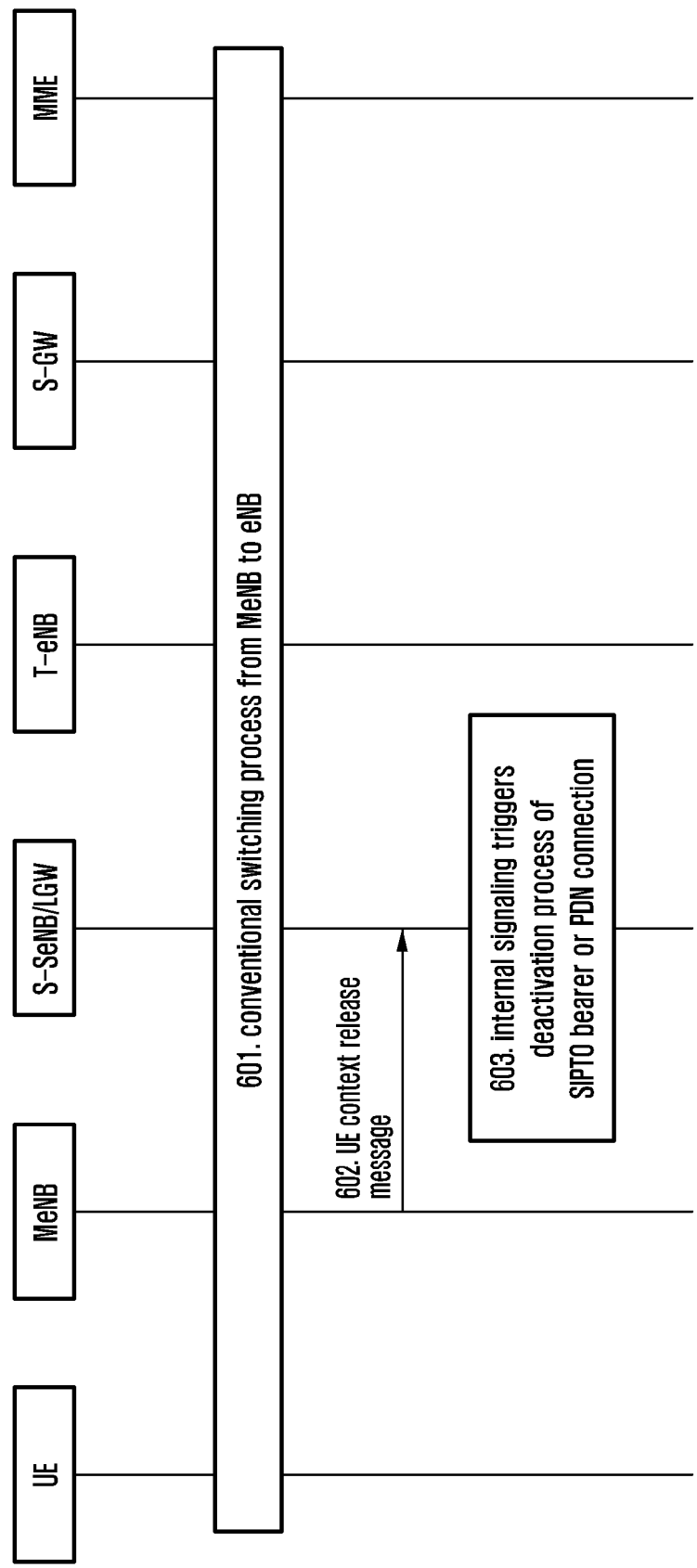
[Fig. 6]

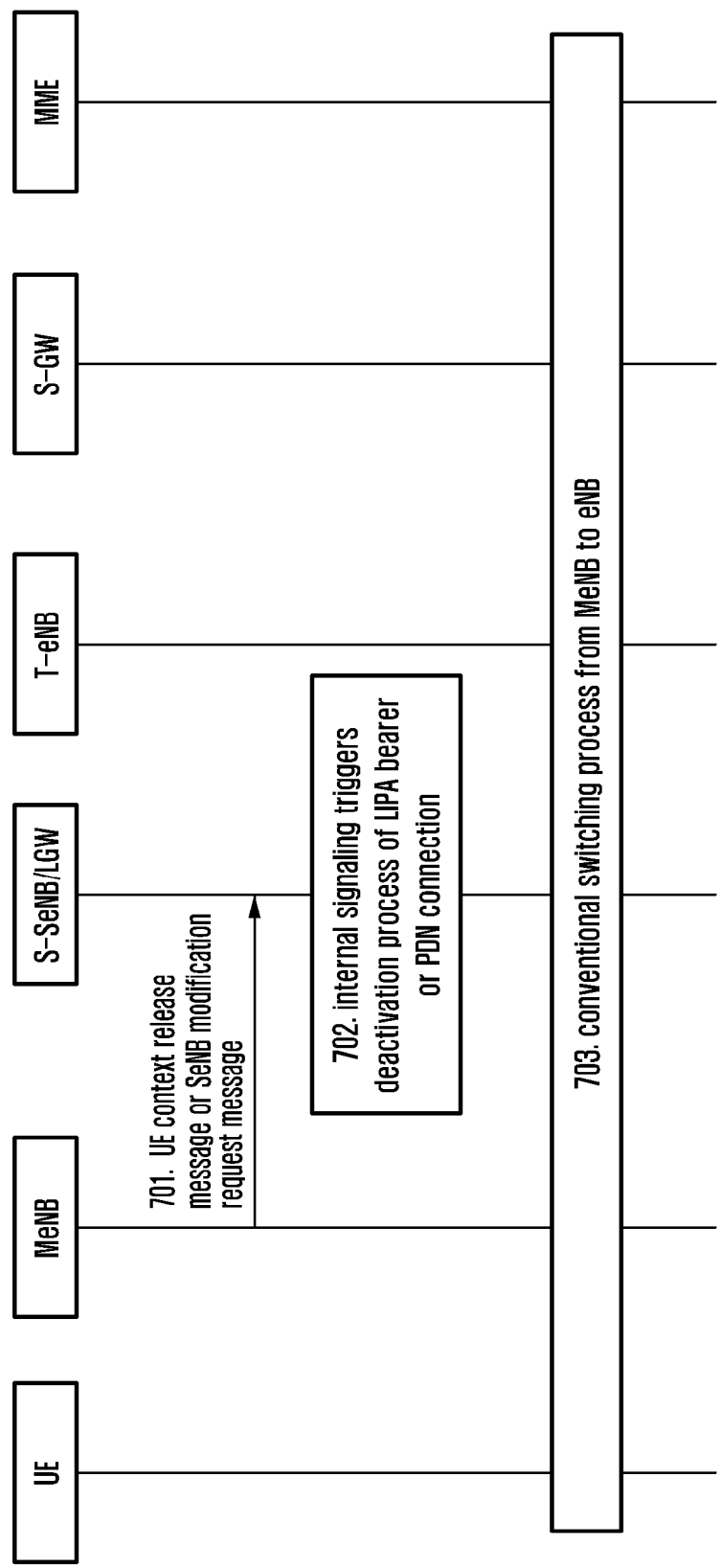
[Fig. 7]

METHODS AND DEVICES FOR SUPPORTING RELEASE OF SIPTO BEARER OR LIPA BEARER IN DUAL-CONNECTIVITY ARCHITECTURE

PRIORITY

This application is a National Phase Entry of PCT International Application No. PCT/KR2016/010986 which was filed on Sep. 30, 2016, and claims priority to Chinese Patent Application No. 201510640863.X, which was filed on Sep. 30, 2015, the content of each of which is incorporated herein by reference.

TECHNICAL FIELD

The present disclosure relates to radio communication technologies, and more particularly to methods and devices for supporting release of a Selected IP Traffic Offload (SIPTO) bearer or a Local IP Access (LIPA) bearer in dual-connectivity architecture.

BACKGROUND ART

Modern mobile communication technology tends to provide high-data-rate multimedia services for users. FIG. 1 is a diagram illustrating the structure of a System Architecture Evolution (SAE).

In FIG. 1, User Equipment (UE) 101 is a terminal device for receiving data. An Evolved Universal Terrestrial Radio Access Network (E-UTRAN) 102 is a radio access network which includes an evolved Node B (eNodeB)/NodeB for providing a radio network interface for the UE. A Mobile Management Entity (MME) 103 is configured to manage mobility contexts, session contexts and security information of the UE. A Serving Gateway (SGW) 104 is configured to provide functions of a subscriber plane. The MME 103 and the SGW 104 may be located in the same physical entity. A Packet Gateway (PGW) 105 is configured to implement charging and legal monitoring functions. The PGW 105 and the SGW 104 may be located in the same physical entity. A Policy and Charging Rules Function (PCRF) 106 is configured to provide QoS policies and charging rules. A Service GPRS Supporting Node (SGSN) 108 is a network node device for providing routing for data transmission in a Universal Mobile Telecommunications System (UMTS). A Home Subscriber Server (HSS) 109 is a home subsystem of the UE and is configured to protect user information including the current location of the UE, the address of a serving node, user security information and packet data contexts of the UE.

The Rel-12 of 3GPP brings forward that it is required to enhance small cells. As shown in FIG. 2, in small cell architecture, UE may receive and send data through two eNodeBs (eNBs) at the same time, which is called dual-connectivity. One of the two eNBs is configured to send Radio Resource Control (RRC) messages to the UE, and interact with a MME on the control plane of a core network. This eNB is called a Master eNB (MeNB), and the other one of the two eNBs is called a Secondary eNB (SeNB). A cell of the MeNB is a Primary cell (Pcell) of the UE, via which the MeNB may send the RRC messages to the UE. Other cells are Secondary cells (Scells). One of Scells of the SeNB is a Pcell of SeNB (pScell) of the UE. There is an uplink physical control channel on the pScell, and there is no uplink physical control channel on other Scells. A cell group of the MeNB is called MCG, and a cell group of the SeNB is called SCG. The resources of the SCG at the UE side are configured by the SeNB. The SeNB sends the configuration for the UE to the MeNB via a RRC container, and then the MeNB sends the configuration for the UE to the UE. The MeNB does not parse the RRC container, or parse the RRC container but does not change the configuration in the RRC container.

Local traffic offload supported in the dual-connectivity architecture includes Local IP Access (LIPA) and Selected IP Traffic Offload (SIPTO). How the LIPA and the SIPTO are applied to the dual-connectivity architecture is a problem being discussed by 3GPP. At present, 3GPP mainly discusses how a LIPA bearer or a SIPTO bearer is established in the dual-connectivity architecture. For the release of the SIPTO bearer or the LIPA bearer in the dual-connectivity architecture, some problems have not been solved by current mechanisms, which will be illustrated hereinafter in detail.

A conventional S1 release process is shown in FIG. 3. A MME sends a message to a SGW to release an access bearer on the SGW. The MME sends a UE context release command to an eNB to release UE context on the eNB. The bearer information on a PGW is stored. In this case, even if there is a SIPTO bearer or a LIPA bearer established for the UE, the eNB does not need to send an internal singling to a collocated Local Gateway (LGW) to trigger a deactivation process of the SIPTO bearer or the LIPA bearer when the eNB receives the UE context release command.

The bearer deactivation process may be initiated by the PGW or the MME. If the bearer deactivation process is initiated by the MME, the MME sends a bearer deletion command to the SGW firstly, and then the SGW sends the bearer deletion command to the PGW. The bearer deactivation process initiated by the PGW is shown in FIG. 4. Since the bearer context on the PGW has been deleted, the eNB does not need to send an internal signaling to the collocated LGW to trigger the deactivation process of the SIPTO bearer or the LIPA bearer after the eNB receives the bearer deletion command.

For the LIPA bearer, a source eNB initiates a LIPA bearer release process before a switching process, and then the switching process is performed. For the SIPTO bearer, the source eNB initiates the switching process firstly, and after receiving a UE context release message from a target eNB or receiving a UE context deletion command from the MME, sends an internal signaling to the LGW to release the SIPTO bearer or Packet Data Network (PDN) connection on the LGW.

In the dual-connectivity architecture, when the LGW is collocated on the SeNB, how the SIPTO bearer or the LIPA bearer on the SeNB is released has not been discussed in detail.

DISCLOSURE OF INVENTION

Technical Problem

The present disclosure provides methods and devices for supporting the release of a SIPTO bearer or a LIPA bearer in dual-connectivity architecture, so as to release the SIPTO bearer or the LIPA bearer in the dual-connectivity architecture duly and accurately.

Solution to Problem

In order to implement the above object, the solution of the present disclosure is implemented as follows.

A method for supporting release of a Selected IP Traffic Offload (SIPTO) bearer in dual-connectivity architecture includes:

receiving, by a Secondary evolved Node B (SeNB), a message sent by a Master eNB (MeNB), and removing radio and control plane resources of a SIPTO at local network bearer;

after determining that the message contains indication information for SIPTO at local network bearer deactivation, sending, by the SeNB, an internal signaling to a collocated Local Gateway (LGW) to indicate the collocated LGW to release Packet Data Network (PDN) connection of SIPTO at local network; and the SeNB being a SeNB supporting functions of the LGW that supports operations of the SIPTO at local network.

Preferably, the message is a User Equipment (UE) context release message or a SeNB modification request message.

A method for supporting release of a Selected IP Traffic Offload (SIPTO) bearer in dual-connectivity architecture includes:

sending, by a Master evolved Node B (MeNB), a message to a Secondary eNB (SeNB), the message containing indication information for SIPTO at local network bearer deactivation, and the indication information being for indicating the SeNB to notify a collocated Local Gateway (LGW) of releasing Packet Data Network (PDN) connection of SIPTO at local network; and the SeNB being a SeNB supporting functions of the LGW that supports operations of SIPTO at local network.

Preferably, when the SIPTO at local network bearer on the SeNB is to be deleted during a switching process, the MeNB includes the indication information in the message; and/or when change of the SeNB occurs or switching from the MeNB to another eNB terminates, including, by the MeNB, the indication information in the message.

Preferably, the method comprises: the message sent by the MeNB does not contain the indication information to indicate the SeNB not to notify the collocated LGW of releasing the PDN connection of the SIPTO at local network.

Preferably, when receiving a UE context release command or an Evolved Radio Access Bearer (ERAB) deletion command from a Mobile Management Entity (MME), the MeNB does not include the indication information in the message.

Preferably, the message is a UE context release message or a SeNB modification request message.

A method for supporting release of a Selected IP Traffic Offload (SIPTO) bearer in dual-connectivity architecture includes:

sending, by a Master evolved Node B (MeNB), a message to a Secondary eNB (SeNB), the message containing indication information for SIPTO at local network bearer deactivation and the indication information being for indicating the SeNB to notify a collocated Local Gateway (LGW) of releasing Packet Data Network (PDN) connection of SIPTO at local network;

receiving, by the SeNB, the message, removing radio and control plane related resources associated to the UE context or the SIPTO at local network bearer, and after determining that the message contains the indication information, sending an internal signaling to the collocated LGW to indicate the collocated LGW to release the PDN connection of the SIPTO at local network; and the SeNB being a SeNB supporting functions of the LGW that supports operations of the SIPTO at local network.

A Secondary evolved Node B (SeNB) for supporting release of a Selected IP Traffic Offload (SIPTO) bearer in dual-connectivity architecture includes a receiving unit, a detecting unit and a notifying unit;

the receiving unit is configured to receive a message sent by a Master eNB (MeNB), and remove radio and control plane resources of a SIPTO at local network bearer;

the detecting unit is configured to detect indication information for SIPTO at local network bearer deactivation in the message, and send a notification indication to the notifying unit after detecting the indication information; and the notifying unit is configured to send an internal signaling to a collocated Local Gateway (LGW) to indicate the collocated LGW to release Packet Data Network (PDN) connection of SIPTO at local network after receiving the notification indication from the detecting unit.

A Master evolved Node B (MeNB) for supporting release of a Selected IP Traffic Offload (SIPTO) bearer in dual-connectivity architecture includes an information generating unit and a sending unit;

the information generating unit is configured to include indication information for SIPTO at local network bearer deactivation in a message to indicate a Secondary eNB (SeNB) to notify a collocated Local Gateway (LGW) of releasing Packet Data Network (PDN) connection of SIPTO at local network; and the sending unit is configured to send the message containing the indication information to the SeNB.

A method for supporting release of a Local IP Access (LIPA) bearer in dual-connectivity architecture includes:

receiving, by a Secondary evolved Node B (SeNB), a message sent by a Master eNB (MeNB), and removing radio and control plane resources of a LIPA bearer;

after determining that the message contains indication information for LIPA bearer deactivation, sending, by the SeNB, an internal signaling to a collocated Local Gateway (LGW) to indicate the collocated LGW to release Packet Data Network (PDN) connection of LIPA; and the SeNB being a SeNB supporting functions of the LGW that supports operations of the LIPA.

Preferably, the message is a User Equipment (UE) context release message or a SeNB modification request message.

A method for supporting release of a Local IP Access (LIPA) bearer in dual-connectivity architecture includes:

sending, by a Master evolved Node B (MeNB), a message to a Secondary eNB (SeNB), the message containing indication information for LIPA bearer deactivation and the indication information being for indicating the SeNB to notify a collocated Local Gateway (LGW) of releasing Packet Data Network (PDN) connection of LIPA; and the SeNB being a SeNB supporting functions of the LGW that supports operations of the LIPA.

Preferably, when the LIPA bearer on the SeNB is to be deleted during a switching process, the MeNB includes the indication information in the message; and/or before switching from the MeNB to another eNB, including, by the MeNB, the indication in the message.

Preferably, the method comprises: the message sent by the MeNB does not contain the indication information to indicate the SeNB not to notify the collocated LGW of releasing the PDN connection of the LIPA.

Preferably, when receiving a User Equipment (UE) context release command or an Evolved Radio Access Bearer (ERAB) deletion command from a Mobile Management Entity (MME), the MeNB does not include the indication information in the message.

Preferably, the message is a UE context release message or a SeNB modification request message.

A method for supporting release of a Local IP Access (LIPA) bearer in dual-connectivity architecture includes:

sending, by a Master evolved Node B (MeNB), a message to a Secondary eNB (SeNB), the message containing indication information for LIPA bearer deactivation and the indication information being for indicating the SeNB to notify a collocated Local Gateway (LGW) of releasing Packet Data Network (PDN) connection of LIPA;

receiving, by the SeNB, the message, removing radio and control plane resources of the LIPA bearer, and after determining that the message contains the indication information, sending an internal signaling to the collocated LGW to indicate the collocated LGW to release the PDN connection of the LIPA; and the SeNB being a SeNB supporting functions of the LGW that supports operations of the LIPA.

A Secondary evolved Node B (SeNB) for supporting release of a Local IP Access (LIPA) bearer in dual-connectivity architecture includes a receiving unit, a detecting unit and a notifying unit;

the receiving unit is configured to receive a message sent by a Master eNB (MeNB), and remove radio and control plane resources of a LIPA bearer;

the detecting unit is configured to detect indication information for LIPA bearer deactivation in the message, and send a notification indication to the notifying unit when detecting the indication information; and the notifying unit is configured to send an internal signaling to a collocated Local Gateway (LGW) to indicate the collocated LGW to release Packet Data Network (PDN) connection of LIPA after receiving the notification indication from the detecting unit.

A Master evolved Node B (MeNB) for supporting release of a Local IP Access (LIPA) bearer in dual-connectivity architecture includes an information generating unit and a sending unit;

the information generating unit is configured to include indication information for LIPA bearer deactivation in a message to indicate a Secondary eNB (SeNB) to notify a collocated Local Gateway (LGW) of releasing Packet Data Network (PDN) connection of LIPA; and the sending unit is configured to send the message containing the indication information to the SeNB.

Advantageous Effects of Invention

As can be seen from the above solution, by the methods for supporting the release of the SIPTO bearer or the LIPA bearer in the dual-connectivity architecture, the SIPTO bearer or the LIPA bearer in the dual-connectivity architecture can be released accurately. Accordingly, inaccurate operations in an access network can be avoided, and the SIPTO bearer or the LIPA bearer can be released duly and accurately, thereby avoiding inaccurate release of the SIPTO bearer or the LIPA bearer.

BRIEF DESCRIPTION OF DRAWINGS

FIG. 5 is a flowchart illustrating a method for supporting the release of a SIPTO bearer or a LIPA bearer in dual-connectivity architecture according to the present disclosure.

FIG. 6 is a flowchart illustrating a method for supporting the release of a SIPTO bearer or a LIPA bearer in dual-connectivity architecture according to a first embodiment of the present disclosure.

FIG. 7 is a flowchart illustrating a method for supporting the release of a SIPTO bearer or a LIPA bearer in dual-connectivity architecture according to a second embodiment of the present disclosure.

MODE FOR THE INVENTION

Figure 1:
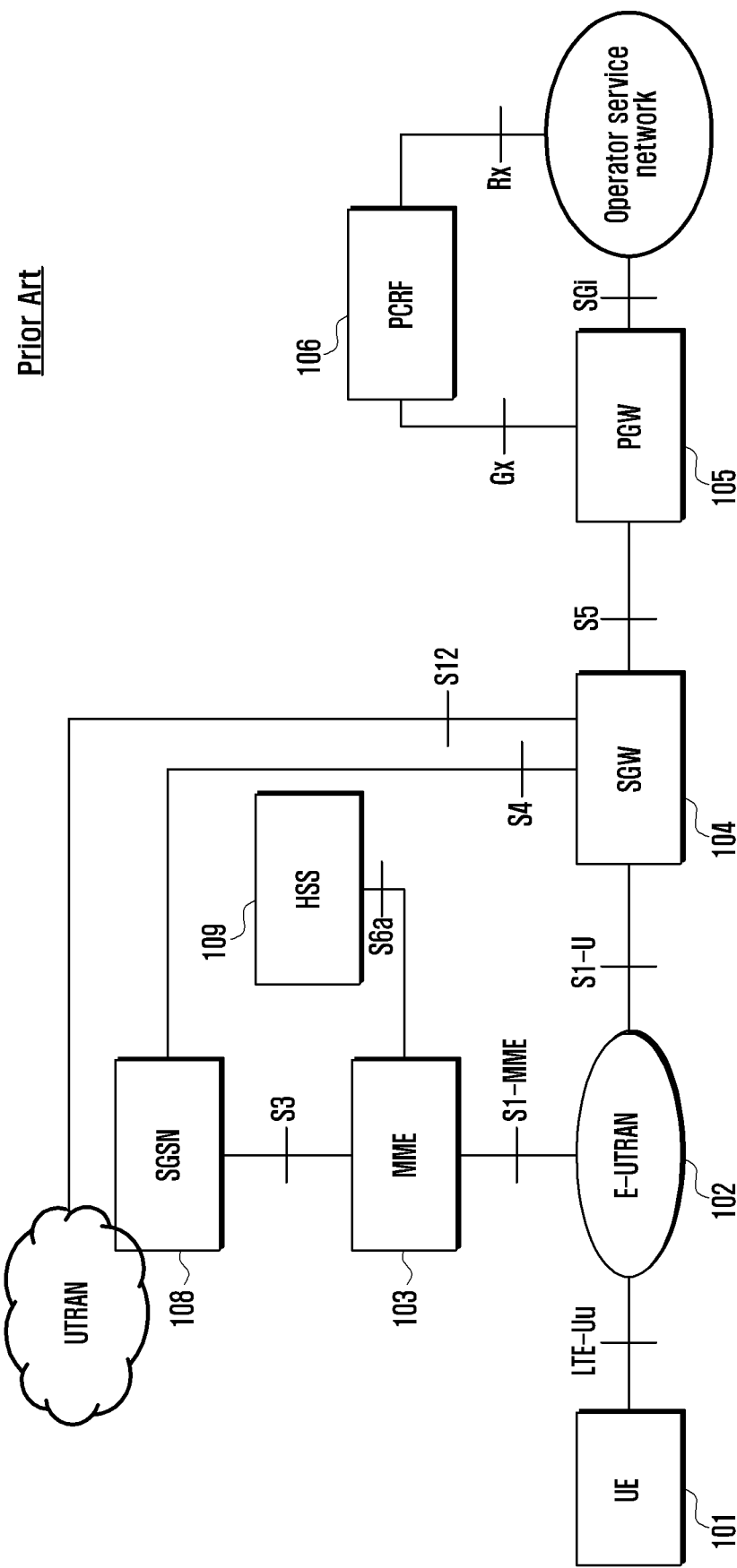
FIG. 1 is a diagram illustrating the structure of a conventional System Architecture Evolution (SAE).
Figure 2:
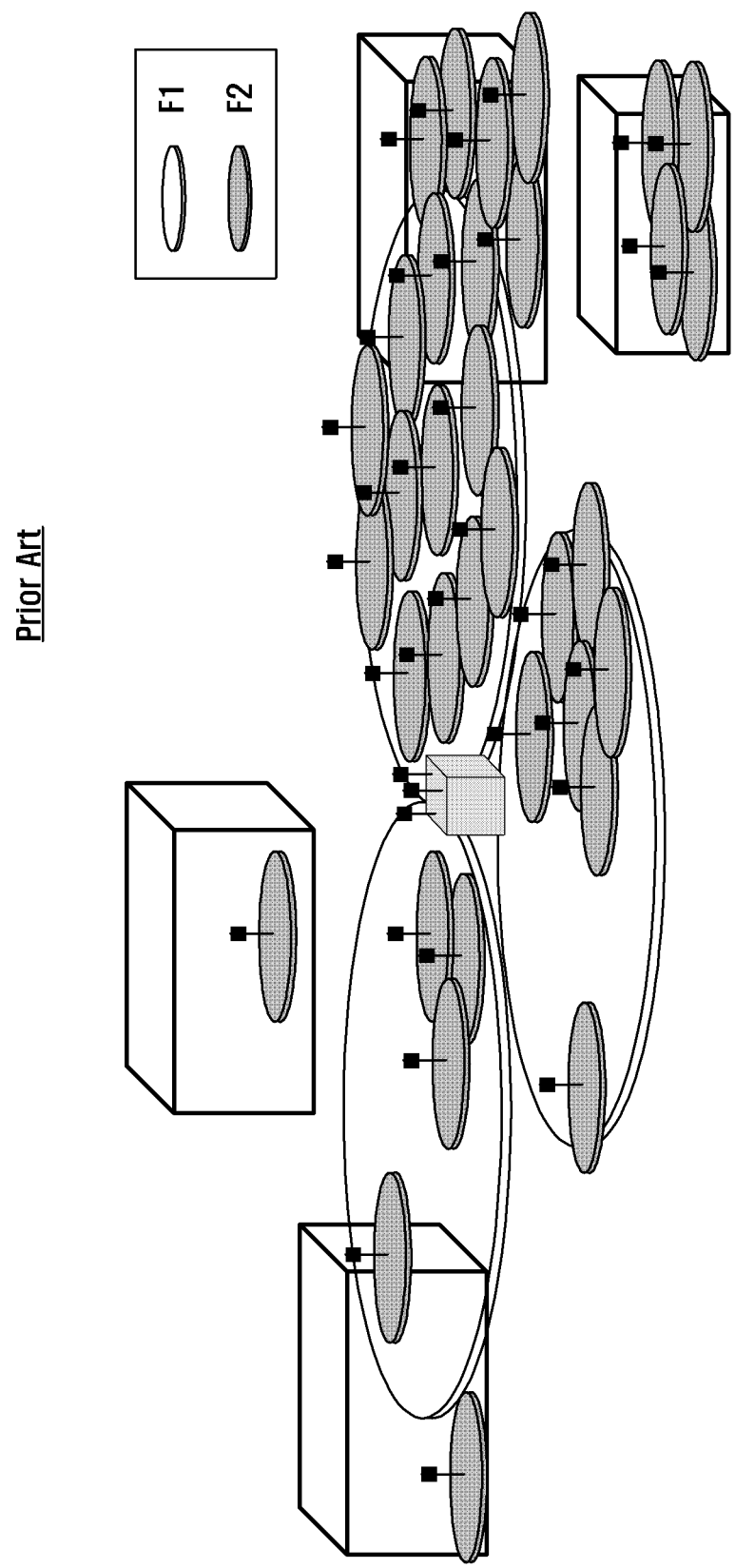
FIG. 2 is a diagram illustrating a deployment scenario of small cell enhancement.
Figure 3:
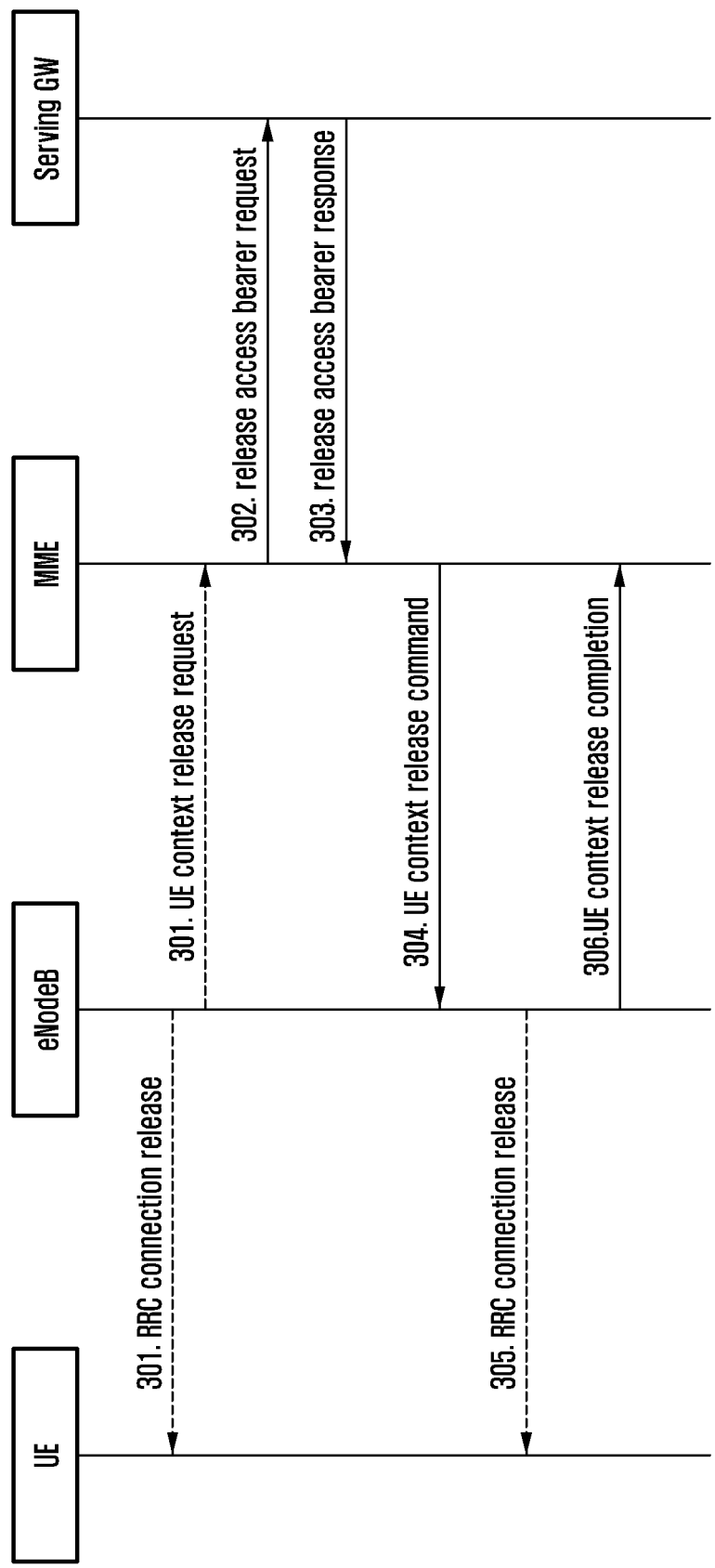
FIG. 3 is a flowchart illustrating a conventional S1 release process.
Figure 4:
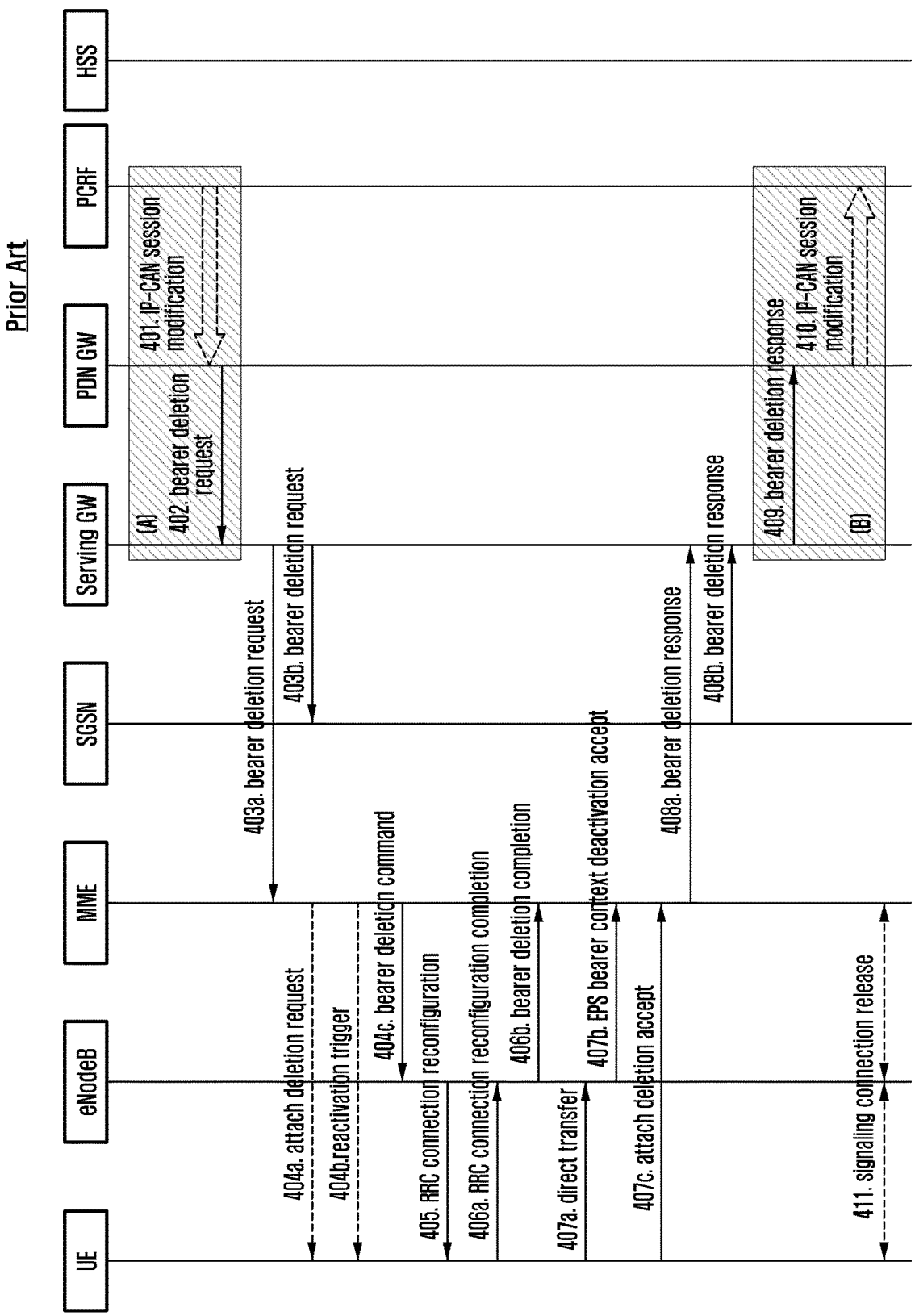
FIG. 4 is a flowchart illustrating a bearer deactivation process initiated by a PGW.

In order to make the object, technical solution and merits of the present disclosure clearer, the present disclosure will be illustrated in detail hereinafter with reference to the accompanying drawings.

In dual-connectivity architecture, when a LGW is collocated on a SeNB and if a conventional LIPA bearer deactivation mechanism is adopted in a switching process, a LIPA bearer on the SeNB is released by a source eNB before the switching process. If there are other bearers on the SeNB besides the LIPA bearer, a MeNB sends a SeNB modification request message to the SeNB. The SeNB modification request message contains information of the to-be-released LIPA bearer. If there is only the LIPA bearer on the SeNB, the MeNB sends a UE context release message to the SeNB. Besides the switching process, in a scenario of a LIPA bearer release process and an S1 release process initiated by a MME, the MeNB sends the SeNB modification request message or the UE context release message to the SeNB after receiving a message from the MME. That is to say, both in the switching process and in the scenario of the LIPA bearer release process and the S1 release process initiated by the MME, the SeNB receives the SeNB modification request message or the UE context release message from the MeNB. In the switching process, the SeNB needs to send an internal signaling to the LGW to trigger the deactivation process of the LIPA bearer or PDN connection, but does not need to send the internal signaling to the LGW in the scenario of the LIPA bearer release process and the S1 release process initiated by the MME. However, after receiving the SeNB modification request message or the UE context release message, the SeNB does not know whether to trigger the deactivation process of the LIPA bearer or the PDN connection.

Similarly, in the dual-connectivity architecture, when the LGW is collocated on the SeNB and switching is needed (for example, switching from the MeNB to another eNB or the change of the SeNB), for a SIPTO bearer on the SeNB, a conventional SIPTO bearer deactivation mechanism is adopted in the switching process. Upon receiving a UE context release message from a target eNB or a UE accessed to the target SeNB successfully when the switching process terminates, the source eNB triggers the deactivation process of the SIPTO bearer or PDN connection. The MeNB sends a UE context release message to the SeNB. Besides the switching process, in a scenario of the S1 release process initiated by the MME, the MeNB also sends the UE context release message to the SeNB after receiving a message from the MME. That is to say, both in the switching process and in the scenario of the S1 release process initiated by the MME, the SeNB receives the UE context release message from the MeNB. In the switching process, the SeNB needs to send an internal signaling to the LGW to trigger the deactivation process of the SIPTO bearer or the PDN connection at a local network, but does not need to send the internal signaling to the LGW in the scenario of the S1 release process initiated by the MME. However, after receiving the UE context release message, the SeNB does not know whether to trigger the deactivation process of the SIPTO bearer or the PDN connection at the local network.

In the dual-connectivity architecture, when the LGW is collocated on the SeNB and the SIPTO bearer or the LIPA bearer is released according to the conventional SIPTO bearer or LIPA bearer deactivation mechanism in the switching process, some problems may occur. Accordingly, the present disclosure provides a new method for releasing the SIPTO bearer or the LIPA bearer. By the method, the SeNB can accurately release the SIPTO bearer or the LIPA bearer, thereby avoiding inaccurate operations in an access network, ensuring that the SIPTO bearer or the LIPA bearer can be released duly and accurately, and avoiding inaccurate release of the PDN connection of SIPTO or LIPA.

The present disclosure provides three methods for supporting the release of the SIPTO at local network (SIPTO@LN) bearer or the LIPA bearer, which include a processing method of the MeNB, a processing method of the SeNB and a system-level processing method by combining the above two methods.

The processing method of the MeNB includes that the MeNB sends a message to the SeNB. The message contains indication information for SIPTO at local network bearer deactivation or LIPA bearer deactivation. The indication information may indicate the SeNB to notify the collocated LGW of releasing the PDN connection of the SIPTO at local network or the PDN connection of the LIPA.

The processing method of the SeNB includes that the SeNB receives the message sent by the MeNB, removes radio and control plane related resources associated to the UE context or the SIPTO at local network bearer or the LIPA bearer, and sends an internal signaling to the collocated LGW if the received message contains the indication information for the SIPTO at local network bearer deactivation or the LIPA bearer deactivation. The indication information may indicate the collocated LGW to release the PDN connection of the SIPTO at local network or the PDN connection of the LIPA.

The SeNB is a SeNB supporting functions of the LGW that supports operations of the SIPTO at local network or operations of the LIPA.

As mentioned above, the system-level processing method includes the processing method of the MeNB and the processing method of the SeNB. That is, the system-level processing method is described based on the interaction between the MeNB and the SeNB. Since the system-level processing method includes the processing method of the MeNB and the processing method of the SeNB, the implementations of the three methods are described through describing the system-level processing method.

FIG. 5 is a flowchart illustrating a method for supporting the release of a SIPTO bearer or a LIPA bearer in dual-connectivity architecture according to the present disclosure. The method is how a SIPTO at local network bearer or a LIPA bearer is released when the dual-connectivity architecture supports the SIPTO at local network or the LIPA and when a LGW is located on a SeNB. The method shown in FIG. 5 is described according to the system-level processing method. In the method, a UE context release message or a SeNB modification request message is used to inform the SeNB SIPTO@LN or LIPA bearer release by the MeNB. The method includes following blocks.

At block 501, a MeNB sends a UE context release message or a SeNB modification request message to the SeNB. The UE context release message or the SeNB modification request message contains indication information for SIPTO at local network bearer deactivation or LIPA bearer deactivation.

The indication information may be represented with one information element. Accordingly, in a scenario of releasing the LIPA bearer, the information element may indicate whether the SeNB needs to notify the collocated LGW to deactivate the LIPA bearer. In a scenario of releasing the SIPTO at local network bearer, the information element may indicate whether the SeNB needs to notify the collocated LGW to deactivate the SIPTO at local network bearer. Or, the indication information may be represented with two information elements for the SIPTO at local network bearer and the LIPA bearer respectively. In this case, the two information elements respectively represent the indication information for the SIPTO at local network bearer deactivation and the indication information for the LIPA bearer deactivation. The information element may be named with another name. By the information element, the SeNB may know whether to send an internal signaling to the collocated LGW to release the PDN connection of the SIPTO at local network or the PDN connection of the LIPA when releasing the SIPTO at local network bearer or the LIPA bearer. That is, if the indication information is contained, the SeNB is indicated to notify the collocated LGW of releasing the PDN connection of the SIPTO at local network or the PDN connection of the LIPA. Further, if the indication information is not contained, the SeNB is indicated not to notify the collocated LGW of releasing the PDN connection of the SIPTO at local network or the PDN connection of the LIPA. It will be described hereinafter that in which condition the indication information needs to be contained so as to notify the collocated LGW of releasing the PDN connection of the SIPTO at local network or the PDN connection of the LIPA, and in which condition the indication information does not need to be contained so as not to notify the collocated LGW of releasing the PDN connection of the SIPTO at local network or the PDN connection of the LIPA.

For the SIPTO at local network bearer, if the MeNB receives a UE context release command or an Evolved Radio Access Bearer (ERAB) deletion command (for deleting the SIPTO at local network bearer) from the MME, the UE context release message or the SeNB modification request message sent by the MeNB to the SeNB does not contain the indication information for the SIPTO at local network bearer deactivation. When receiving the UE context release message or the SeNB modification request message (for deleting the SIPTO at local network bearer), the SeNB removes radio and control plane related resources associated to the UE context or the SIPTO at local network bearer. The SeNB is a SeNB supporting functions of the LGW that supports operations of the SIPTO at local network.

If the SIPTO at local network bearer on the SeNB needs to be deleted because of switching (for example, switching from the MeNB to another eNB or the change of the SeNB), the UE context release message or the SeNB modification request message sent by the MeNB to the SeNB contains the indication information for the SIPTO at local network bearer deactivation. After receiving the UE context release message or the SeNB modification request message (for deleting the SIPTO at local network bearer), the SeNB removes the radio and control plane related resources associated to the UE context or the SIPTO at local network bearer. The SeNB sends an internal signaling to the LGW to request the LGW to release the PDN connection of SIPTO at local network. The SeNB is a SeNB supporting functions of the LGW that supports operations of the SIPTO at local network.

For the LIPA bearer, if the MeNB receives a UE context release command or an ERAB deletion command (for deleting the LIPA bearer) from the MME, the UE context release message or the SeNB modification request message (for deleting the LIPA bearer) sent by the MeNB to the SeNB does not contain the indication information for the LIPA bearer deactivation. After receiving the UE context release message or the SeNB modification request message, the SeNB removes radio and control plane resources of the LIPA bearer. The SeNB is a SeNB supporting functions of the LGW that supports operations of the LIPA.

If the LIPA bearer on the SeNB needs to be deleted because of switching (for example, switching from the MeNB to another eNB or the change of the SeNB), the UE context release message or the SeNB modification request message sent by the MeNB to the SeNB contains the indication information for the LIPA bearer deactivation. After receiving the UE context release message or the SeNB modification request message (for deleting the LIPA bearer), the SeNB removes the radio and control plane resources of the LIPA bearer. The SeNB sends an internal signaling to the LGW to request the LGW to release the PDN connection of the LIPA. The SeNB is a SeNB supporting functions of the LGW that supports operations of the LIPA.

For SIPTO at local network bearer, when the change of the SeNB occurs or the switching from the MeNB to another eNB terminates and when the MeNB receives a UE context deletion message from a target eNB, the MeNB sends the UE context release message to the SeNB or the source SeNB. The UE context release message contains the indication information for the SIPTO at local network bearer deactivation. After receiving the UE context release message, the SeNB releases the radio and control plane resources of the SIPTO at local network, and sends the internal signaling to the LGW to request the LGW to release the PDN connection of the SIPTO at local network. The SeNB is a SeNB supporting functions of the LGW that supports operations of the SIPTO at local network.

For the LIPA bearer, before the switching from the MeNB to another eNB or the change of the SeNB, the MeNB sends a message to the SeNB, and the message may be the UE context release message or the SeNB modification request message. The message contains the indicating information for triggering the lease of the LIPA bearer. If there is only the LIPA bearer on the SeNB, the message is the UE context release message. If there are other bearers on the SeNB besides the LIPA bearer, the message is the SeNB modification request message. The message contains an ERAB identification of the to-be-released LIPA bearer. After receiving the message, the SeNB releases the radio and control plane resources of the LIPA bearer, and sends the internal signaling to the LGW to request the LGW to release the PDN connection of the LIPA. The SeNB is a SeNB supporting functions of the LGW that supports operations of the LIPA.

At block 502, the SeNB receives the UE context release message or the SeNB modification request message from the MeNB, releases the radio and control plane related resources associated to the UE context or the SIPTO at local network bearer or the LIPA bearer, and sends the internal signaling to the collocated LGW to release the PDN connection of the SIPTO at local network or the PDN connection of the LIPA if the received message contains the indication information for the SIPTO at local network bearer deactivation or the LIPA bearer deactivation.

If the UE context release message or the SeNB modification request message received by the SeNB from the MeNB does not contain the indication information for the SIPTO at local network bearer deactivation, the SeNB removes the radio and control plane related resources associated to the UE context or the SIPTO at local network bearer. The SeNB is a SeNB supporting functions of the LGW that supports operations of the SIPTO at local network.

If the UE context release message or the SeNB modification request message received by the SeNB from the MeNB contains the indication information for the SIPTO at local network bearer deactivation, the SeNB removes the radio and control plane related resources associated to the UE context or the SIPTO at local network bearer, and sends the internal signaling to the LGW to request the LGW to release the PDN connection of the SIPTO at local network. The SeNB is a SeNB supporting functions of the LGW that supports operations of the SIPTO at local network.

If the UE context release message or the SeNB modification request message received by the SeNB from the MeNB does not contain the indication information for the LIPA bearer deactivation, the SeNB removes the radio and control plane resources of the LIPA bearer. The SeNB is a SeNB supporting functions of the LGW that supports operations of the LIPA.

If the UE context release message or the SeNB modification request message received by the SeNB from the MeNB contains the indication information for the LIPA bearer deactivation, the SeNB removes the radio and control plane resources of the LIPA bearer, and sends the internal signaling to the LGW to request the LGW to release the PDN connection of the LIPA. The SeNB is a SeNB supporting functions of the LGW that supports operations of the LIPA.

And thus, the flowchart shown in FIG. 5 terminates. The method shown in FIG. 5 describes how the SIPTO at local network bearer or the LIPA bearer is released when the MeNB triggers the change of the SeNB or the switching from the MeNB to another eNB. In the method, the indication information is contained in the UE context release message or the SeNB modification request message to duly notify the collocated LGW of releasing the PDN connection of the SIPTO at local network or the PDN connection of the LIPA, thereby ensuring that the SIPTO at local network bearer or the LIPA bearer is released duly and avoiding the inaccurate operations in the access network. In FIG. 5, the release of the SIPTO at local network bearer and the release of the LIPA bearer are described together for convenience. In actual applications, the two flowcharts may be separate.

Further, in the flowchart shown in FIG. 5, the system-level processing method is described based on the interaction between the MeNB and the SeNB. As mentioned above, the present disclosure also provides the processing method of the MeNB and the processing method of the SeNB, which have been described at block 501 and block 502 respectively, and thus are not described herein. In FIG. 5, the UE context release message or the SeNB modification request message is used as the message to inform the SeNB of SIPTO@LN bearer release or LIPA bearer release by the MeNB. In actual applications, the indication information may also be contained in another message to notify the collocated LGW of releasing the PDN connection of the SIPTO at local network or the PDN connection of the LIPA.

FIG. 6 is a flowchart illustrating a method for supporting the release of a SIPTO bearer or a LIPA bearer in dual-connectivity architecture according to a first embodiment of the present disclosure. This method is how a SIPTO at local network bearer is released. In the method, the dual-connectivity architecture supports the SIPTO at local network, and a LGW is located on a SeNB. The method shown in FIG. 6 includes following blocks.

At block 601, a MeNB decides to switch a UE to a target eNB. The MeNB initiates a conventional switching process from the MeNB to the target eNB.

At block 602, the MeNB sends a UE context release message to the SeNB.

This block is the last step of the conventional switching process from the MeNB to the target eNB.

According to previously stored information, the MeNB knows that there is a SIPTO at local network bearer established at the SeNB. The MeNB includes the indication information for the SIPTO at local network bearer deactivation in the UE context release message.

At block 603, after receiving the UE context release message, the SeNB releases radio and control plane related resources associated to the UE context. If the received message contains indication information for the SIPTO at local network bearer deactivation, the SeNB sends an internal signaling to the LGW to request the LGW to release the PDN connection of the SIPTO at local network. The SeNB is a SeNB supporting functions of the LGW that supports operations of the SIPTO at local network. The LGW initiates a deactivation process of conventional bearer or PDN connection triggered by the PGW.

In the method shown in FIG. 6, a source SeNB sends an internal signaling to the LGW when receiving the UE context release message, to trigger the deactivation process of the SIPTO@LN bearer or PDN connection, thereby ensuring that the SIPTO at local network bearer is released duly.

FIG. 7 is a flowchart illustrating a method for supporting the release of a SIPTO bearer or a LIPA bearer in dual-connectivity architecture according to a second embodiment of the present disclosure. This method is how a LIPA bearer is released. In this method, the dual-connectivity architecture supports the LIPA, and a LGW is located on a SeNB. The method shown in FIG. 7 includes following blocks.

At block 701, a MeNB decides to switch a UE to a target eNB. According to previously stored information, the MeNB knows that there is a LIPA bearer established on the SeNB.

The MeNB sends a message to the SeNB, and the message may be a UE context release message or a SeNB modification request message. The message contains indication information for the LIPA bearer deactivation. If there is only the LIPA bearer on the SeNB, the message is the UE context release message. If there other bearers on the SeNB besides the LIPA bearer, the message is the SeNB modification request message. The message contains an ERAB identification of the to-be-released LIPA bearer.

At block 702, after receiving the UE context release message or the SeNB modification request message, the SeNB releases radio and control plane resources of the LIPA bearer. If the received message contains the indication information for the LIPA bearer deactivation, the SeNB sends an internal signaling to the LGW to request the LGW to release the PDN connection of the LIPA. The SeNB is a SeNB supporting functions of the LGW that supports operations of the LIPA. The LGW initiates a deactivation process of conventional bearer or PDN connection triggered by the PGW.

At block 703, the MeNB initiates a conventional switching process from the MeNB to the target eNB.

In the method shown in FIG. 7, the source SeNB sends the internal signaling to the LGW when receiving the UE context release message or the SeNB modification request message, to trigger the deactivation process of the LIPA bearer or PDN connection, thereby ensuring that the LIPA bearer is released duly.

The foregoing is the implementation of the method for supporting the release of the SIPTO bearer or the LIPA bearer in the dual-connectivity architecture. The present disclosure also provides two devices for supporting the release of the SIPTO bearer or the LIPA bearer in the dual-connectivity architecture. The two devices may be applied to the processing method of the MeNB and the processing method of the SeNB respectively.

The device corresponding to the processing method of the MeNB includes an information generating unit and a sending unit. The information generating unit may include the indication information for the SIPTO at local network bearer deactivation or the LIPA bearer deactivation in a message, to indicate the SeNB to notify the collocated LGW of releasing the PDN connection of the SIPTO at local network or the PDN connection of the LIPA. The sending unit may send the message generated by the information generating unit to the SeNB.

The device corresponding to the processing method of the SeNB includes a receiving unit, a detecting unit and a notifying unit. The receiving unit may receive the message sent by the MeNB and remove the radio and control plane related resources associated to the UE context or the SIPTO at local network bearer or the LIPA bearer. The detecting unit may detect the indication information for the SIPTO at local network bearer deactivation or the LIPA bearer deactivation in the received message, and send a notification indication to the notifying unit after detecting the indication information. The notifying unit may send an internal signaling to the collocated LGW after receiving the notification indication from the detecting unit, to indicate the collocated LGW to release the PDN connection of the SIPTO at local network or the PDN connection of the LIPA.

The foregoing is only preferred embodiments of the present disclosure and is not used to limit the protection scope of the present disclosure. Any modification, equivalent substitution and improvement without departing from the spirit and principle of the present disclosure are within the protection scope of the present disclosure.

The invention claimed is:

1. A method performed by a first base station in a wireless communication system, the method comprising:
   receiving, from a second base station, a first message for releasing a context of a terminal;
   releasing a resource associated with the context of the terminal as a response to receiving the first message;
   identifying whether the first message includes deactivation information, wherein the deactivation information indicates that the deactivation of a packet data network (PDN) connection for a selected IP traffic offload (SIPTO) is needed; and
   transmitting, to a network entity by an internal signaling, a second message for releasing the PDN connection for the SIPTO, in case that the first message includes the deactivation information.

2. The method of claim 1,
   wherein the network entity is a local gateway (LGW) collocated with the first base station for the SIPTO at a local network.

3. The method of claim 1, wherein the first message is received from the second base station in case that the first base station is to be changed for the SIPTO, and
wherein a second message triggers the release of the PDN connection after a change of the first base station is performed.

4. The method of claim 1, wherein the first base station is a secondary eNode B (SeNB) and the second base station is a master eNode B (MeNB) for the terminal.

5. A method performed by a second base station in a wireless communication system, the method comprising:
generating deactivation information, wherein the deactivation information indicates that the deactivation of a packet data network (PDN) connection for a selected IP traffic offload (SIPTO) is needed; and
transmitting, to a first base station, a first message for releasing a context of a terminal and including the deactivation information,
wherein a resource associated with the context of the terminal is released by the first base station as a response to the first message being received by the first base station,
wherein whether the first message includes the deactivation information is identified by the first base station, and
wherein a second message for releasing the PDN connection for the SIPTO is transmitted to a network entity by an internal signaling, in case that the first message includes the deactivation information.

6. The method of claim 5,
wherein the network entity is a local gateway (LGW) collocated with the first base station for the SIPTO at a local network.

7. The method of claim 5, wherein the first message is transmitted to the first base station in case that the first base station is to be changed for the SIPTO, and
wherein a second message triggers the release of the PDN connection after a change of the first base station is performed.

8. The method of claim 5, wherein the first base station is a secondary eNode B (SeNB) and the second base station is a master eNode B (MeNB) for the terminal.

9. A first base station in a wireless communication system, the first base station comprising:
a transceiver; and
a controller configured to:
receive, from a second base station via the transceiver, a first message for releasing a context of a terminal,
release a resource associated with the context of the terminal as a response to receiving the first message,
identify whether the first message includes deactivation information, wherein the deactivation information indicates that the deactivation of a packet data network (PDN) connection for a selected IP traffic offload (SIPTO) is needed, and
transmit, to a network entity by an internal signaling, a second message for releasing the PDN connection for the SIPTO, in case that the first message includes the release information.

10. The first base station of claim 9,
wherein the network entity is a local gateway (LGW) collocated with the first base station for the SIPTO at a local network.

11. The first base station of claim 9, wherein the first message is received from the second base station in case that the first base station is to be changed for the SIPTO, and
wherein a second message triggers the release of the PDN connection after a change of the first base station is performed.

12. The first base station of claim 9, wherein the first base station is a secondary eNode B (SeNB) and the second base station is a master eNode B (MeNB) for the terminal.

13. A second base station in a wireless communication system, the second base station comprising:
a transceiver; and
a controller configured to:
generate deactivation information, wherein the deactivation information that the deactivation of a packet data network (PDN) connection for a selected IP traffic offload (SIPTO) is needed, and
transmit, to a first base station via the transceiver, a first message for releasing a context of a terminal and including the deactivation information,
wherein a resource associated with the context of the terminal is released by the first base station as a response to the first message being received by the first base station,
wherein whether the first message includes the deactivation information is identified by the first base station, and
wherein a second message for releasing the PDN connection for the SIPTO is transmitted to a network entity by an internal signaling, in case that the first message includes the deactivation information.

14. The second base station of claim 13,
wherein the network entity is a local gateway (LGW) collocated with the first base station for the SIPTO at a local network.

15. The second base station of claim 13, wherein the first message is transmitted to the first base station in case that the first base station is to be changed for the SIPTO, and
wherein a second message triggers the release of the PDN connection after a change of the first base station is performed.

16. The second base station of claim 13, wherein the first base station is a secondary eNode B (SeNB) and the second base station is a master eNode B (MeNB) for the terminal.

* * * * *